March 21, 1944. C. A. CORNELL 2,344,677
TIRE PATCH
Filed Dec. 16, 1941

Inventor
Charles A. Cornell
By Eccleston & Eccleston
Attorneys

Patented Mar. 21, 1944

2,344,677

UNITED STATES PATENT OFFICE 2,344,677

TIRE PATCH

Charles A. Cornell, Johnstown, Ohio

Application December 16, 1941, Serial No. 423,231

4 Claims. (Cl. 152—367)

This invention relates to repair patches for pneumatic tire casings and has for its primary object to generally improve the wearing ability of such patches in the cold method of tire repairing without vulcanizing.

The failures of tires repaired by the use of cold patches are generally attributable to two main causes, namely, rapid chewing through the body portion of the patch owing to the fact that the injury is not vulcanized and the edges of the broken portion of the casing bite the patch at each revolution of the tire as it flexes, and heavy or multiple ply patches in which the plies are not graduated sufficiently or run parallel to the plies in the tire casing to provide proper flexing, causing the tire to cup at the injury which wears out the thread prematurely and causes pounding of the tire as it rotates.

It is therefore an object of the present invention to entirely eliminate such disadvantages and yet provide a patch which is relatively light in weight and highly flexible in use.

Other objects and advantages of the invention will be apparent from the following description when taken in connection with the accompanying drawing, in which, Figure 1 is a fragmentary edge view of a pneumatic tire casing showing the new patch in section applied thereto.

Figure 1:
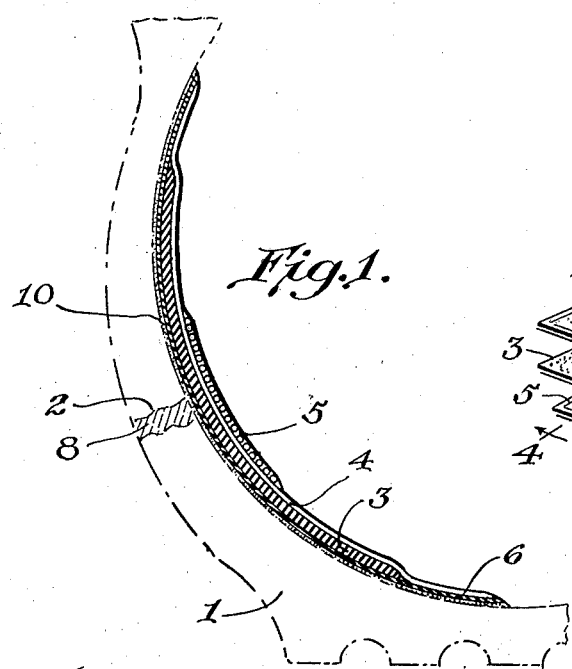
Figure 3:
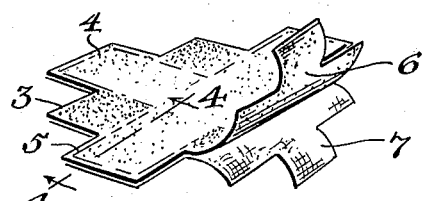
Figure 3 is a perspective view of the repair patch after being vulcanized.
Figure 2:
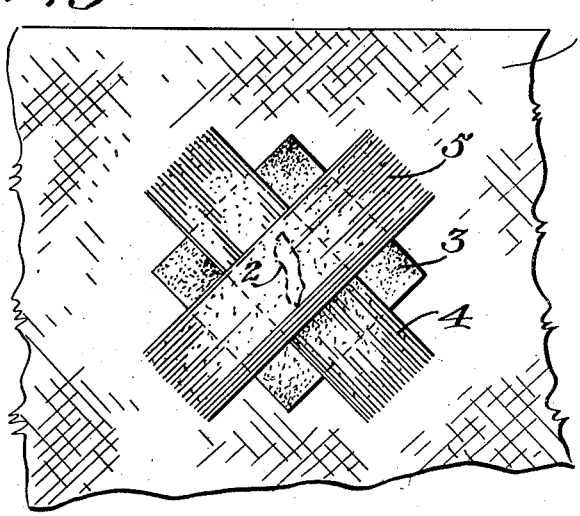
Figure 2 is a plan view of a portion of a tire casing with the repair in place and also shown in plan.

Referring to the drawing in greater detail, the numeral 1 indicates a portion of a pneumatic tire casing which has been rendered unfit for use by reason of a blow-out or other injury, as indicated by the numeral 2.

The patch for repairing the damaged portion of the casing consists of a relatively thick ply of non-abrasive rubber, commonly known as high tensile low abrasion tread stock, and designated by the numeral 3, over which are applied the two right angularly arranged strips of rubberized cord or fabric 4 and 5. These elements are of course vulcanized in a press.

To the face ply 3 a layer of raw gum 6 is applied for adhesive purposes. This layer of gum is protected by a sheet or layer of holland linen 7, which is of course intended to be removed when the patch is placed in use.

In applying this cold patch to a damaged casing, it is not necessary to first trim off the rough edges of the damaged portion of the tire to prevent chafing. A coating of rubber cement 10 is applied to the inner face of the casing surrounding the injury. The sheet of holland linen is removed from the face of the patch and the patch is placed in position with the cords of the two strips 4 and 5 extending in the direction of the cords of the tire casing and the largest ply in contact with the inner face of the tire casing.

Figure 5:
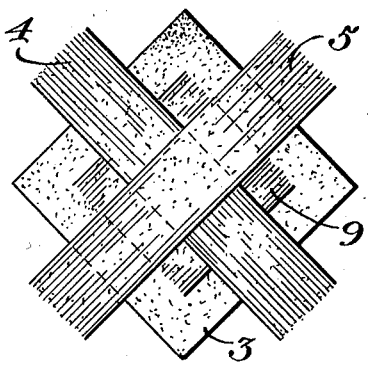
Figure 5 is a plan view of a slightly modified form of patch.
Figure 4:
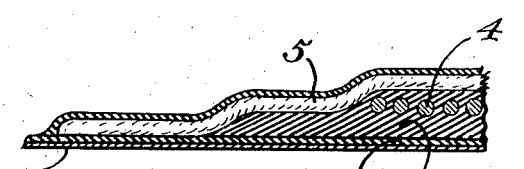
Figure 4 is a fragmentary sectional view through the patch after being vulcanized but before being cemented to a tire casing, taken on line 4—4 of Figure 3.

The repair patch shown in Figure 5 is substantially the same as the patch previously described except that it is provided with a ply 9 of rubberized cord between the ply of non-abrasive gum 3 and the rubberized fabric strips 4 and 5. This second and smaller ply 9 is intended for reinforcement purposes and is generally used when the injured portion of the tire is relatively large.

In the use of this repair patch, the cross strips 4 and 5 provide a two ply reinforcement at the center while the placing of the cords or strips in parallelism with the cords of the casing provide strength and uniformity of flexing. The single face ply of non-abrasive rubber covers the entire area adjacent the injury thereby retarding the biting and chafing action of the injury against the body portion of the patch structure and as the non-abrasive face ply of rubber is elastic it gives readily with each bite of the injury and as it recovers its original form quickly after flexing it provides perfect uniformity of flexing between the casing and the body portion of the patch.

In accordance with the patent statutes I have described what I now believe to be the preferred forms of the invention but inasmuch as various minor changes may be made in the details of construction without departing from the spirit of the invention, it is intended that all such changes be included within the scope of the appended claims.

What is claimed is:

1. A light and highly flexible repair patch for tire casings, consisting of a flexible body portion of non-abrasive rubber only, and two superposed single ply members of rubberized cord overlying the body portion, said single ply members being angularly arranged and in strip form narrower than the body portion to extend beyond the margin of the body portion, the cords of said members extending longitudinally thereof.

2. A light and highly flexible repair patch for tire casings consisting of, a flexible body portion of non-abrasive rubber only, and superposed single ply members overlying the body portion, said single ply members being in strip form narrower than the body portion and arranged at right angles to extend beyond the margins of the body portion, the cords of said members extending longitudinally thereof.

3. A light and highly flexible repair patch for tire casings consisting of, a square flexible body portion of non-abrasive rubber only, and superposed single ply members overlying the body portion, said single ply members being in strip form narrower than the body portion and arranged at right angles to extend beyond the margins of the body portion, the cords of said members extending longitudinally thereof.

4. A repair patch for tire casings, composed solely of a flexible sheet of non-abrasive rubber and a pair of right-angularly arranged single ply members of rubberized cord superposed on the rubber sheet with the cords of the members extending longitudinally thereof, whereby a patch of light weight and high flexibility is provided.

CHARLES A. CORNELL.